March 6, 1956  A. LE GAL  2,736,979

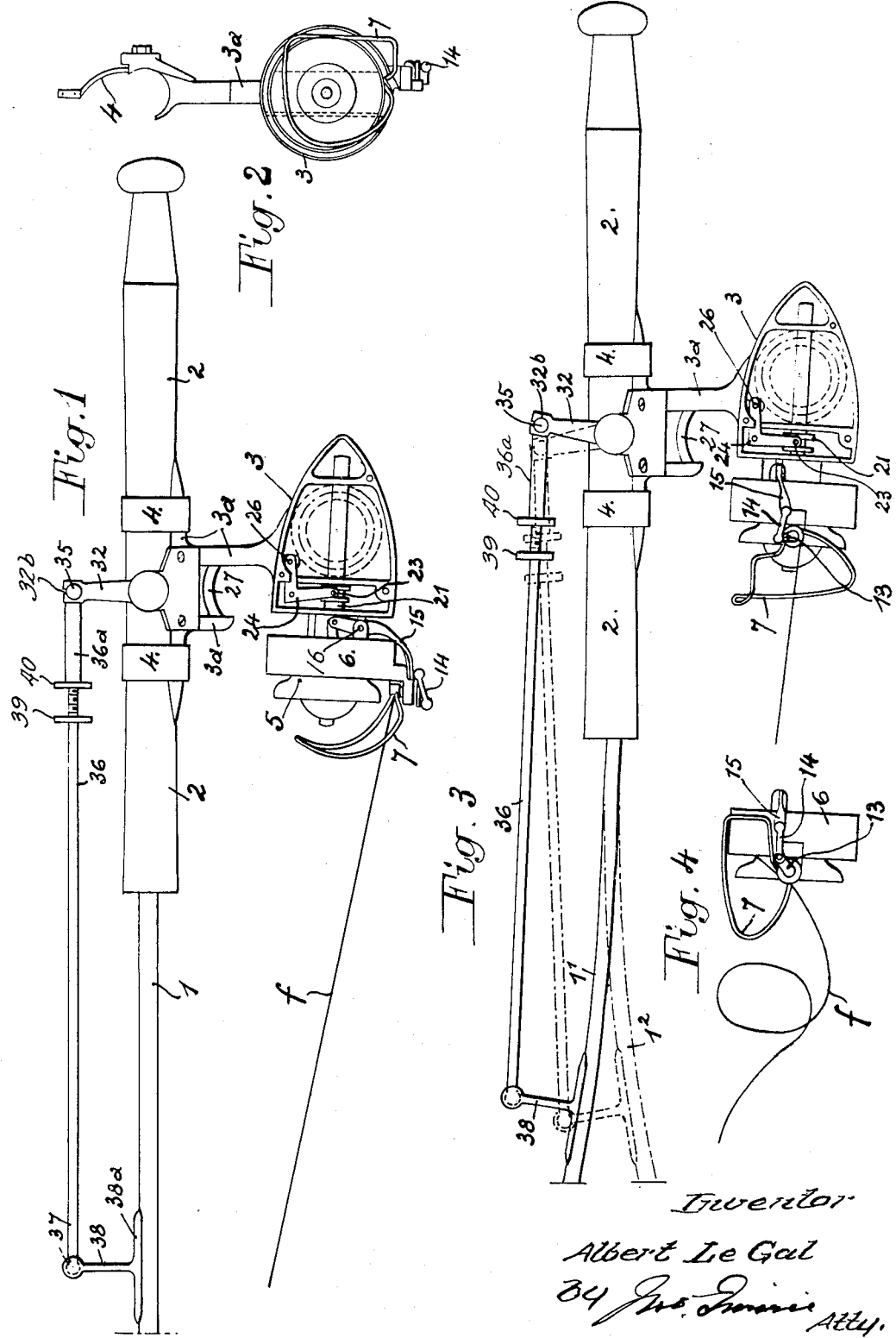

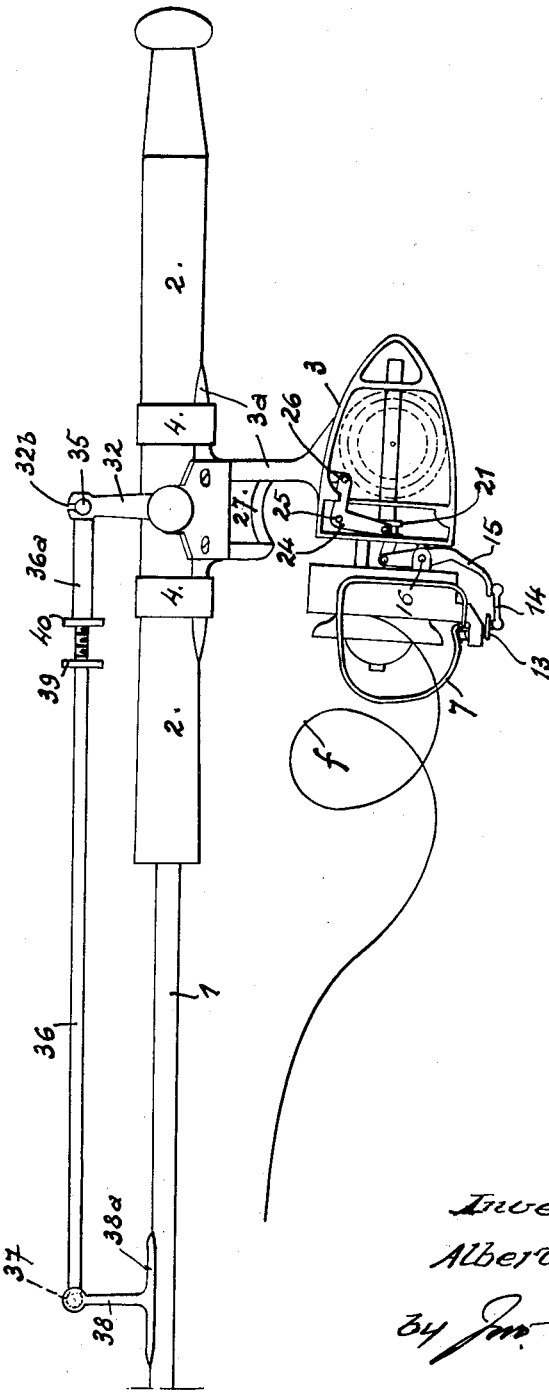

FISHING DEVICES FOR CASTING

Filed March 16, 1953  5 Sheets-Sheet 3

Inventor
Albert Le Gal
By Jno. Irwin
Atty.

March 6, 1956  A. LE GAL  2,736,979
FISHING DEVICES FOR CASTING
Filed March 16, 1953  5 Sheets-Sheet 4

Inventor
Albert Le Gal
by Jno. Irving
Atty.

March 6, 1956 A. LE GAL 2,736,979
FISHING DEVICES FOR CASTING
Filed March 16, 1953 5 Sheets-Sheet 5
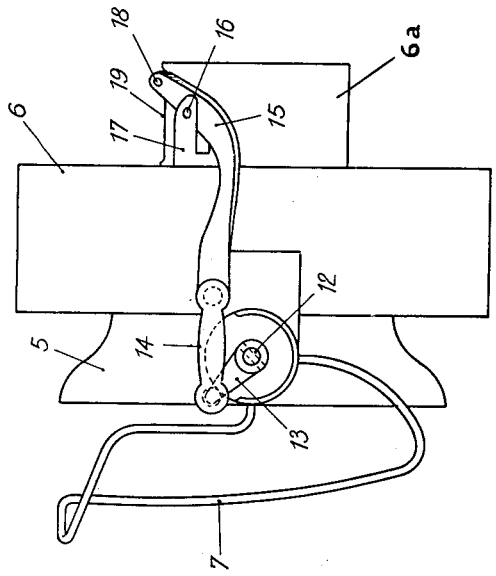
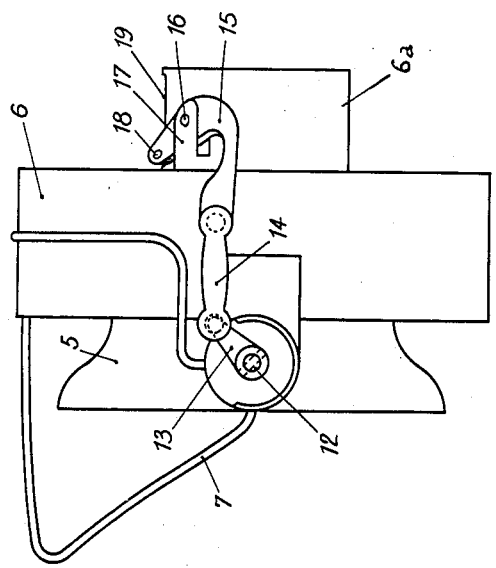
INVENTOR
ALBERT LE GAL

United States Patent Office 2,736,979
Patented Mar. 6, 1956

2,736,979

FISHING DEVICES FOR CASTING

Albert Le Gal, Toulon, France

Application March 16, 1953, Serial No. 342,651

Claims priority, application France April 17, 1952

4 Claims. (Cl. 43—20)

It is known that in fishing devices for the so-called "casting" which comprise a fixed spool, the line is wound on the spool by a member called "pick-up" which rotates about the spool. Before casting the lure or the bait, the pick-up is disengaged from the edge of the spool and the line which is thus released is seized with a finger of the left hand, is laid against the handle of the fishing-rod and is held there by the forefinger of the right hand, whereafter the casting movement is imparted to the fishing-rod. Then, as the fishing-rod resumes its straight position after the impulse, the line is released and thus left to unwind freely.

In devices having a rotating spool, certain manipulations are also necessary in order to release the line at the proper moment, when the fishing-rod straightens itself after the casting impulse.

The present invention has for its object an improvement in fishing devices for "casting" which renders this kind of fishing much easier by doing away with the manipulations which were heretofore necessary in both above mentioned cases.

With this object in view, the invention is essentially characterized by the feature according to which the bending and the subsequent straightening of the fishing-rod, which are produced by the "casting," are used for causing the automatic release of the line.

In a device having a reel with a fixed spool, the pick-up is provided with a controlling device operatively connected to the fishing-rod and adapted to cause the automatic opening of the pick-up and the release of the line under the effect of the bending and subsequent straightening of the fishing-rod.

In a preferred embodiment, to which the invention is however not limited, the invention may further comprise one or more of the following features:

(a) The above mentioned controlling device includes a spring which is combined with a tensioning device, the opening of the pick-up being controlled by the release of the spring, while the closure of the pick-up is caused by the tensioning of said spring.

(d) The device for tensioning the spring includes a trigger which is solid with a stirrup having a resilient tongue, in combination with a rocking member having a central projection on which the said tongue is hooked up in the tensioned position, said rocking member further carrying two lateral projections and being connected to the fishing-rod by a link in such manner that the upward or downward bending of the fishing-rod, according to whether the "casting" is effected normally or in reverse, determines the engagement of said tongue with one or the other of said lateral projections, and the subsequent straightening of the fishing-rod determines the escape of said tongue and consequently the release of said spring.

(c) The aforesaid trigger is solid with an arm which is hingedly connected to one arm of a transmission lever the other arm of which controls a sliding sleeve which, in turn, controls the opening and the closing of the pick-up, through a linkage including a lever pivotally mounted on the pick-up carrier and a crank hingedly connected to said lever.

Other features of the invention will be disclosed in the following specification.

The appended drawings show by way of example an embodiment of a fishing device for the so-called "casting," with a reel having a fixed spool and provided with the improvements according to the invention.

Fig. 1 is a longitudinal elevation view of the whole device, in the position of rest (fishing-rod straight, spring tensioned, pick-up closed).

Fig. 2 is a side view of the device, seen from the left side of Fig. 1.

Fig. 3 is another longitudinal elevation of the whole device, in which the fishing-rod is shown in bent condition (the pick-up being still closed, but its carrier being supposed to have turned through 90° with respect to the position of Fig. 1).

Fig. 4 is a partial view corresponding to Fig. 3, with the pick-up opened.

Fig. 5 is an elevation view of the whole device, the fishing-rod being straightened and the pick-up being open.

Fig. 19 is a side view, at a larger scale, of the pick-up carrier, the pick-up and its operating linkage, the pick-up being open.

Fig. 20 is a similar view of the same parts, the pick-up being closed.

Figure 6:
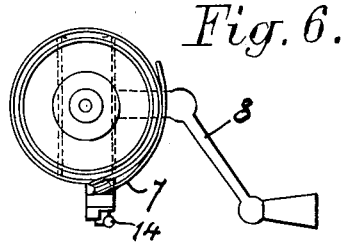
Fig. 6 is a partial left hand side view, the pick-up being open.
Figure 9:
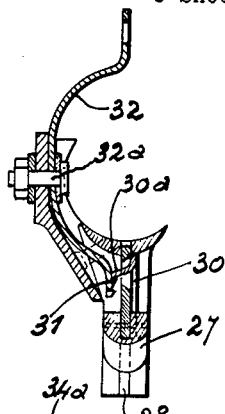
Fig. 9 is a vertical section on line IX—IX of Fig. 7.

On the drawings, 1 is the fishing-rod, 2 is its handle, 3 is the casing of the reel, and 3a is a bracket by which said casing is secured to the handle 2 in any suitable way, for example by means of rings 4. 5 is the fixed spool, 6 is the pick-up carrier, and 7 is the pick-up. The rotation of the carrier 6 and pick-up 7 about the spool 5 is obtained by any suitable mechanism, for example (as shown in Figs. 7 and 8) by a crank 8 driving a bevel wheel 9 which, in turn, drives a bevel pinion 10 keyed on a sleeve 11 which is rotatable on an axle 41 and has a collar 11a secured to the carrier 6.

Figure 11:
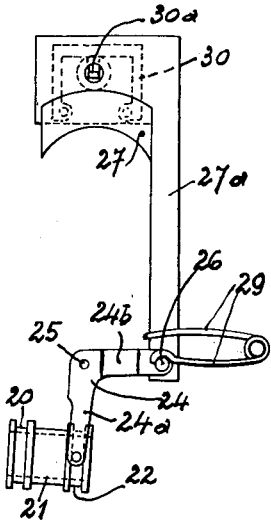
Fig. 11 is an elevation view of the part of the mechanism which includes the trigger, the stirrup with its resilient tongue, the transmission lever and the sliding sleeve.

According to the invention and following the embodiment shown by way of example on the appended drawings, the pick-up 7 (see Figs. 1, 2, 4, 7, 19 and 20) is carried by a pin 12 which is mounted on the carrier 6, so that the pick-up 7 can be rotated with the pin 12, between an open and a closed position, by means of a crank 13 provided on the pin 12 and controlled by a link 14 having ball and socket joints at both ends (see Figs. 19 and 20). Said link 14 is hingedly connected to one end of a lever 15 which is pivotally mounted at 16 in a bracket 17 provided on the pick-up carrier 6. The opposite end of the lever 15 carries a finger 18 which is movable in a curved slot 19 formed in the tubular hub 6a of the support 6. The finger 18 engages a groove 20 formed in a sleeve 21 which is slidably mounted on the above-mentioned rotatable sleeve 11. The sliding sleeve 21 is formed with another groove 22 which is engaged by two diametrally opposed fingers 23 carried by a bracket formed at the end of one arm 24a of a bell-crank lever 24 (Figs. 1, 2, 4 and 7) pivotally mounted at 25 on a fixed pin. The other arm 24b of said lever 24 is hingedly connected at 26 to an arm 27a rigid with a trigger 27 (Figs. 7 and 11) which is slidably mounted in grooves 28 of the bracket 3a of the reel casing.

Figure 7:
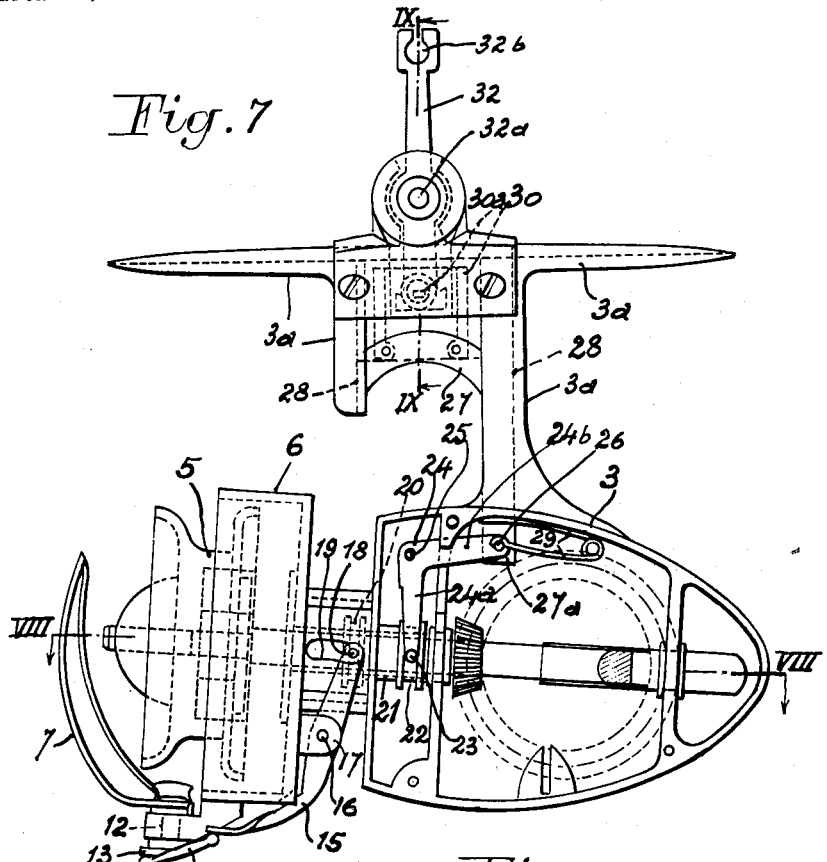
Fig. 7 is a longitudinal elevation of the whole device, at a larger scale, the fishing-rod, connecting link and certain parts of the reel being omitted and the pick-up being closed.
Figure 8:
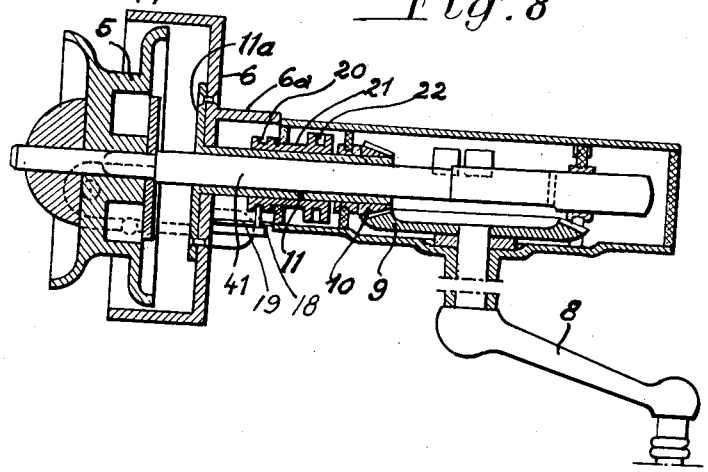
Fig. 8 is a horizontal sectional view on line VIII—VIII of Fig. 7.

Upon the hinge pin 26 presses one end of a tweezer-shaped trigger spring 29 whose opposite end rests against the wall of the casing 3 (see Fig. 7). To the trigger 27 is fastened a stirrup 30 (Figs. 7, 9 and 11 to 14) having a resilient tongue 30a. The stirrup 30 with its tongue 30a may be made of a thin steel plate.

Figure 10:
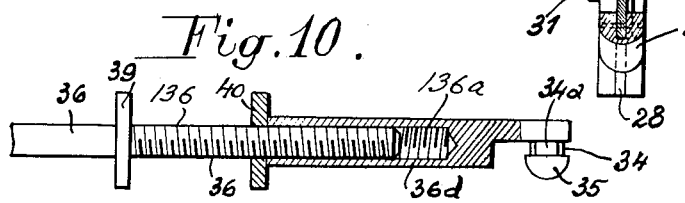
Fig. 10 shows a detail, partly in section, of the link connecting the fishing-rod to the mechanism.
Figures 12, 13, 14:
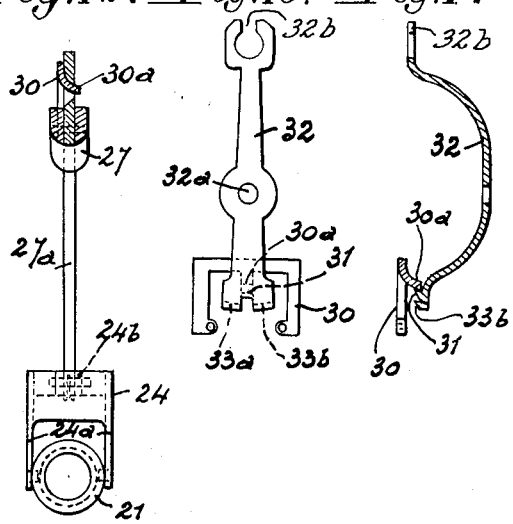
Fig. 12 is a side view, partly in section, of the parts shown in Fig. 11.
Fig. 13 is a front view showing the stirrup in engagement with the rocking member, in the position of rest (the spring being tensioned).
Fig. 14 is a sectional side view of the parts shown in Fig. 13.
Figures 15, 16, 17, 18:
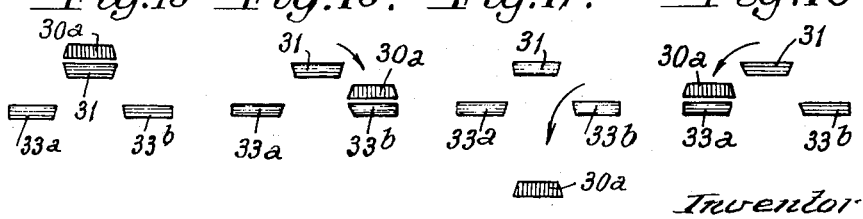
Figs. 15 to 18 are diagrams showing the various positions of the tongue of the stirrup with respect to the projections of the rocking member.

The trigger spring 29 is tensioned when the trigger 27 is in its upper position, the tongue 30a occupying the position shown in Figs. 13, 14 and 15, in which it is hooked up on the central projection 31 of a rocking lever 32 (Figs. 1, 2, 4, 7, 9, 13 and 14), and the pick-up 7 is closed. The rocking lever 32, which is pivotally mounted at 32a, further carries two lateral projections 33a and 33b. The part played by these lateral projections will be explained in the description of the operation of the device. The upper end of the rocking lever 32 is hingedly connected to the rear end of a link 36, by means of a slot 32b formed in the lever 32 and engaging a pin 34 provided on the link 36. As shown in Fig. 10, the pin 34 has flat parts 34a and a retaining head 35. The opposite end of the link 36 is connected by a ball and socket joint 37 to an arm 38 which is secured to the fishing-rod 1 by a bracket 38a. The latter may be welded or tied to the fishing-rod, according to whether the latter is of metal or of a material of vegetable origin.

The link is preferably in two parts, as shown in Fig. 10, so that its length may be adjusted. The male part 36 screw-threaded at 136 is screwed into a female part 36a tapped at 136a, the screwing and unscrewing of the male part 36 being effected by means of a knurled button 39 provided thereon. After adjustment, a nut 40 engaged on the screw-threads 136 of the male part 36 is screwed tightly against the end of the female part 36a in order to lock the two parts against each other.

Before the "casting," the trigger 27 is always brought first into its upper position and left there, without being acted upon by the finger, and the pick-up 7 is closed (see Figs. 1, 3, 7 and 20). Starting from this position, the operation of the device is as follows:

The "casting" movement is imparted to the fishing-rod. By reason of its inertia, said rod first bends as shown at $1^1$ in Fig. 3, so that the arm 38 pushes the link 36 which rocks the lever 32, whose central projection 31 is thus removed from under the resilient tongue 30a which comes to rest upon one of the lateral projections 33b (Fig. 16). The slight release of the spring 29 which results from the slight descent of the tongue 30a and consequently also of the trigger 27 has no effect upon the pick-up 7, which remains closed. Then the fishing-rod straightens again, due to its resiliency, so that the rocking lever 32 is brought back to its first position, the projection 33b moves away under the tongue 30a and the latter escapes through the interval between the projections 33a and 33b and is free to descend into the position shown in Fig. 17, under the action of the spring 29, which draws the stirrup 30, the trigger 27 and its arm 27a downwards. Consequently the lever 24 connected at 26 to said arm 27a rocks about the pin 25 and displaces the sliding sleeve 21, the latter causes a rocking movement of the lever 15, which acts upon the link 14 and crank 13 and thus rotates the pick-up into its open position (see Figs. 4, 5 and 19), in which the line $f$ is released, so that the lure is cast forward by the impulse given to it by the straightening of the fishing-rod.

As soon as the lure touches the surface of the water, or reaches the desired depth, a simple pressure of the finger on the trigger 27 is sufficient to bring the whole mechanism back to its initial position in which the pickup 7 is closed, so that the unwinding of the line $f$ is arrested. One may then turn the crank 8 so as to wind the line $f$ up again on the spool 5 and to draw the lure in.

It will be understood that when the trajectory obtained by the casting is not as desired, the lure can be stopped in mid-air by a simple pressure of the finger on the trigger, which causes, as explained above, the return of the pick-up into the closed position and consequently the arrest of the unwinding of the line. The stopped lure may then be drawn in so as to repeat the casting under better conditions.

When the casting is made "in reverse," the fishing-rod first bends downwards and takes the position $1^2$ of Fig. 3, so that the resilient tongue 30a descends upon the lateral projection 33a of the rocking lever 32 (Fig. 18). The continuation of the operation is similar to that previously described.

The present invention thus replaces the finger control of the pick-up, the precision of which is quite relative and depends on the reflexes of the angler, by an automatic and instantaneous control which is precise and cannot get out of order, whereby more "castings" can be made in the same time and the precision and possibilities of the "casting" are greatly increased in general, and particularly in waterways where this kind of fishing was heretofore practically impossible by reason of the vegetation overgrowing their banks. The device according to the invention also spares a long apprenticeship to beginners.

It will be understood that the invention is not limited to the embodiment which has been described and shown, but includes also any modifications thereof, within the scope of the appended claims.

I claim:

1. An improved fishing device for "casting," comprising a reel, means for attaching said reel to a fishing-rod, a line controlling member mounted on said reel so as to be movable between a line locking position and a line releasing position, resilient means urging said line controlling member towards said line releasing position, releasable locking means adapted to retain said line controlling member in said line locking position against the action of said resilient means, releasing means, and connecting means for operatively connecting said releasing means to said fishing-rod, said releasing means being adapted to release said locking means upon bending and subsequent straightening of said fishing-rod.

2. An improved fishing device for "casting," comprising a reel casing, means for attaching said reel casing to a fishing-rod, a fixed spool mounted on said reel casing, a pick-up rotatable about said spool, means for rotating said pick-up about said spool, said pick-up being hingedly mounted so as to be movable between a line locking position and a line releasing position, resilient means urging said pick-up towards said line releasing position, releasable locking means adapted to retain said pick-up in said line locking position against the action of said resilient means, releasing means, and connecting means for operatively connecting said releasing means to said fishing-rod, said releasing means being adapted to release said locking means upon bending and subsequent straightening of said fishing-rod.

3. An improved fishing device for "casting," comprising a reel casing, a bracket on said casing, means for attaching said bracket to a fishing-rod, a fixed spool mounted on said reel casing, a pick-up carrier rotatable about said spool, means for rotating said pick-up carrier about said spool, a pick-up pivotally mounted on said pick-up carrier so as to be movable between a line locking position and a line releasing position, a linkage connected to said pick-up, a spring acting upon said linkage so as to urge said pick-up towards said lime releasing position, a trigger connected to said linkage, a stirrup rigid with said trigger, a resilient tongue on said stirrup, a rocking member pivotally mounted on said bracket, a central projection on said rocking member, said resilient tongue being adapted to be hooked up on said central projection when said linkage is brought to the position for which said spring is tensioned and said pick-up is in its line locking position, two lateral projections on said rocking member, a link hingedly connected to said rocking member, and means for attaching said link to said fishing-rod so that a bending of said fishing-rod determines a rocking movement of said rocking member whereby said central projection is drawn away under said resilient tongue which comes to rest on one of said lateral projections, and subsequent straightening of said fishing-rod causes an opposite rocking movement of said rocking member whereby said lateral projection is drawn away under said resilient tongue which is released so that said spring is permitted to move said pick-up to its line releasing position.

4. An improved fishing device as claimed in claim 3, wherein said linkage comprises a trigger arm solid with said trigger, a transmission lever pivotally mounted in said reel casing, a sleeve slidably mounted in said reel casing coaxially with said pick-up carrier said sleeve being formed with two grooves, one arm of said transmission lever being hingedly connected to said trigger arm and the other arm of said transmission lever engaging one of said grooves, a lever pivotally mounted on said pick-up carrier, one arm of said last-mentioned lever engaging the other of said grooves, a crank rigid with said pick-up, and a link connecting said crank to the other arm of said last-mentioned lever.

References Cited in the file of this patent

FOREIGN PATENTS

| | | |
|---|---|---|
| 30,052 | Great Britain | Aug. 14, 1913 |
| 904,699 | France | Nov. 13, 1945 |